Nov. 24, 1964  G. GUTJAHR ET AL  3,158,431
PSYCHOLOGICAL TESTING ARRANGEMENT
Filed April 5, 1963
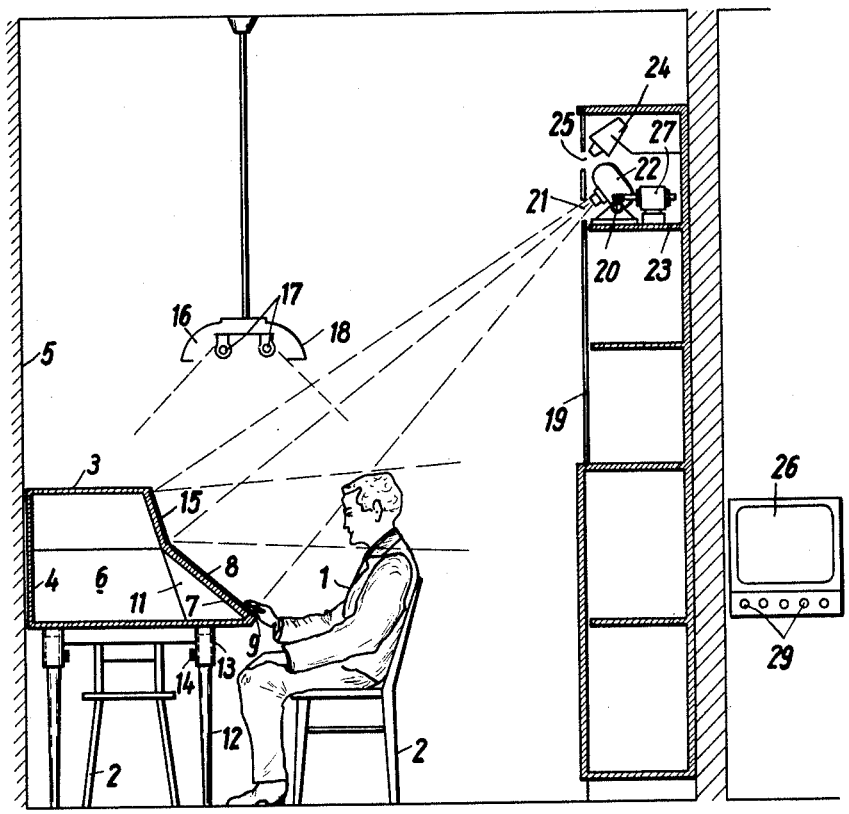
*Inventors:*
GERT GUTJAHR AND
    BERNT SPIEGEL
BY: Louis Berman
    AGENT

3,158,431
PSYCHOLOGICAL TESTING ARRANGEMENT
Gert Gutjahr, Seckenheimer Landstrasse 133, and Bernt Spiegel, Erzberger Strasse 19, both of Mannheim, Germany
Filed Apr. 5, 1963, Ser. No. 270,997
Claims priority, application Germany Apr. 17, 1962
10 Claims. (Cl. 346—107)

This invention relates to psychological testing arrangements, and more particularly to an arrangement for evaluating the visual attractiveness of editorial or advertising matter in newspapers, magazines, and the like.

The time spent by a reader in viewing advertisements or editorial reading matter can be determined from records of ocular movements. The known devices for recording ocular movements which are employed by ophthalmologists and research workers in related fields are not readily usable for evaluating the visual attraction exerted by reading matter. The nature of such medical and scientific devices is such that the person tested is fully aware of the test taking place. The conditions under which the devices are employed are thus not conducive to the spontaneous, almost semiconscious scanning movements of the eye which are characteristic of the normal newspaper or magazine reader. The normal medical or scientific equipment diverts the attention of the reader, and his reaction to the intentional distraction provided by the reading matter is distorted by the intentional concentration on the reading matter by which he attempts to overcome his curiosity toward the equipment.

Even if the ophthalmological apparatus is masked or otherwise made inconspicuous to reduce its direct influence on the person tested, the evaluation of the records produced is difficult and time-consuming. Attempts at reducing the effort spent on reading these records lead to errors so serious as to invalidate the results derived.

The object of the invention is an arrangement which permits ocular movements to be recorded under conditions closely similar to or identical with those prevailing in the normal reading of a newspaper, of a magazine, or of similar reading matter.

Another object is the preparation of records of ocular movements which can be rapidly evaluated with high accuracy.

A further object is a testing arrangement which leaves the person tested entirely unaware of the fact that the test takes place.

With these and other objects in view, the invention provides a testing arrangement in which reading matter is held by suitable means on a fixed support. Another support is provided to hold the person tested in a reading position with respect to the reading matter. A motion picture camera is trained on the reading matter, and simultaneously on the tested person by means of light deflecting means, such as a mirror, arranged on the fixed support to deflect light received from the person to the camera. The reading matter and the reader are illuminated. The camera is hidden from the eye and ear of the person tested.

Other features and many of the attendant advantages of this invention will become apparent from consideration of the following detailed description of a preferred embodiment as illustrated in the attached drawing the sole figure of which shows a testing arrangement of the invention in an elevational view partly in section.

In the drawing, a person 1 being tested is seated on one of three chairs 2 arranged about a reading desk 3. Only two of the chairs 2 are seen in the drawing in which the desk 3 is seen in elevational section. The back wall 4 of the desk is placed against a wall 5. The two sides 6 of the desk of which only one is visible in the drawing, and the desk front 7 are obliquely inclined to form respective supports for reading matter such as the sheet 8 provided on the desk front 7. A rail 9 holds the sheet on the support. The front 7 of the desk is joined to the sides 6 by triangular connecting plates 11.

The desk is supported on four legs 12 slidably arranged in tubular sockets 13 in which the legs 12 may be fastened by set screws 14. The top structure of the desk is thus vertically adjustable to raise or lower a mirror 15 to the eye level of the test person 1 when the same is in reading position with respect to the sheet 8.

A lamp 16 is suspended above the desk 3. The electric light bulbs 17 of the lamp 16 are shielded by a shade 18 in such a manner as to concentrate the light of the bulb 17 on the reading matter on the desk 3 and on the test person.

A cabinet 19 which is constructed of soundproofing material has a transparent window 21 arranged behind and above the person 1. A motion picture camera 22 is arranged on a shelf 23 behind the window 21 in such a manner that its field of view is substantially limited to the desk front 7 and the mirror 15. The mirror is tilted in such a manner as to reflect light coming from the eyes and other portions of the head of the test person to the motion picture camera 22.

A television camera 24, conventionally shown, is arranged behind another transparent window 25 adjacent the motion picture camera 22, and covers substantially the same field as the motion picture camera. The television camera 24 is connected by a conventional non-illustrated circuit to a monitor screen 26 arranged in an adjacent room. The motion picture camera 22 is actuated by an electric motor 27 to which it is connected by a conventional steplessly variable speed transmission 20. Controls 29 arranged on the console of the monitor screen 26 are connected to the television circuit, to the motor 27, and to the transmission 20. They permit the time and speed of operation of the motion picture camera 22 to be remotely controlled.

The arrangement illustrated in the drawing is operated as follows. The average seated height of the persons to be tested is determined. The legs 12 of the desk 3 are then telescoped in the sockets 13 as may be necessary to ensure alignment between the mirror 15 and the eyes of the test persons 1 when the same will be seated before the desk front 7. Images of the eyes are reflected to the motion picture camera 22 and the television camera 24. The sheet 8 which contains editorial matter or advertising matter the visual effectiveness of which is to be determined is placed on the desk front 7.

The test person who may be aware of the fact that he will be subjected to a test, but should be kept in ignorance of the nature of the test, is next requested to enter the "waiting room" until he will be called for his test. He is invited to read whatever matter he may find available.

The test person is left alone in the room, and his further movements are observed on the monitor screen 26. When he settles on the chair 2 before the front desk 7, the moving picture camera 22 is started by means of the controls 29. The electric drive arrangement makes the operation of the camera almost noiseless. The slight whirring sound which is unavoidably produced cannot penetrate the cabinet 19. The person tested remains completely unaware that he is actually being subjected to a test.

As his eyes travel over the reading matter in front of him they are filmed together with the material read. When the film is developed and its individual frames are sequentially projected on a screen at a suitable rate, a very detailed analysis of the eye movements, and precise correlation between the eye movements and the portions of the reading matter looked at is readily feasible. We have found that a technician quickly acquires the ability of correctly interpreting 50 or more frames of the film per minute, and to translate the photographic images into coded signals such as openings in punched cards or the like. The coded information can then be fed to conventional sorting machines or computers for obtaining quantitative data indicative of the effectiveness of the reading matter on the sheet 8.

We have found that the arrangement illustrated and described above is fully effective in maintaining the normal reactions of the test person which would prevail in an ordinary reading situation. The test does not influence its own results. Under the conditions prevailing in our testing arrangement, the eyes of the tested person wander freely over the reading matter in the erratic course characteristic of the normal reader, ready to be diverted from the editorial matter by illustrations, by advertising, and the like, yet not distracted by external influences. There is no conscious effort at concentrating on any portion of the reading matter which impairs the reliability of results achieved with more conspicuous devices.

The arrangement of chairs 2 before the sides 6 of the desk 3 has been found to contribute to the relaxation of the test person. The view of a plurality of chairs and reading surfaces apparently conveys the impression of a freedom of choice between several seats to the test subject, yet it is extremely rare for one to remove the sheet 8 or other reading matter from the desk front 7 and to transfer it to one of the desk sides. It will be understood that additional motion picture and television cameras may be arranged to cover the side positions at the desk in order to test more than one person at a time.

We have found that highly significant data are obtained from most tested persons with a minimum of interpretative effort if the motion picture camera 22 is set to take four frames per second. The infinitely variable speed transmission 20, however, permits the camera speed to be changed from two to 64 frames per second to adjust the apparatus for differences between individual test persons, for different reading matter, and for other purposes.

If so desired, the motion picture camera 22 may be arranged in front of the monitor screen 26 to record the televised image of the scene rather than the scene itself. In such a modification of the illustrated arrangement, the television camera 24, the monitor screen 26, and the circuit connecting them become parts of the motion picture camera means as this term is being employed in this specification and the appended claims.

Quite precise readings of the periods during which the eyes of the test person dwell on any specific portion of the reading matter 8 can be had by merely counting the numbers of frames in which the eyes are directed toward the portion under investigation. When the single sheet 8 is replaced by multi-page reading matter, the attention given to full-page and to double-spread advertisements is readily evaluated in quantitative terms. The arrangement, however, is capable of yielding more complex information as will be evident to those skilled in the art.

Obviously, many modifications and variations of the present invention are possible in the light of the above teachings. It is therefore to be understood that within the scope of the appended claims, the invention may be practiced otherwise than as specifically described.

What is claimed is:

1. In a testing arrangement, in combination:
    (a) a first support;
    (b) holding means for holding reading matter on said support in a predetermined position;
    (c) a second support adapted to hold a person in a reading position with respect to reading matter held in said predetermined position;
    (d) motion picture camera means trained on said first support for recording sequential images of said reading matter;
    (e) light deflecting means on said first support for deflecting light received from a person in said reading position to said motion picture camera means and for simultaneous recording of sequential images of said person and of said reading matter by said camera means;
    (f) illuminating means for illuminating said person and said reading matter in said respective positions thereof; and
    (g) hiding means for hiding said camera means from said person.

2. In an arrangement as set forth in claim 1, said first support being fixed, and said second support being movable with respect to said fixed first support.

3. In an arrangement as set forth in claim 1, said first support including means for varying said predetermined position.

4. In an arrangement as set forth in claim 1, said hiding means including acoustic insulation interposed between said camera means and a person in said reading position.

5. In an arrangement as set forth in claim 1, television camera means trained on a person in said reading position.

6. In an arrangement as set forth in claim 1, said illuminating means including a light source and shielding means for concentrating the light of said source on said reading matter and on said person.

7. In an arrangement as set forth in claim 1, said camera means being arranged behind and above a person in said reading position.

8. In an arrangement as set forth in claim 1, said motion camera means being electrically actuated.

9. In an arrangement as set forth in claim 1, said camera means including a motion picture camera, an electric motor for driving said camera, and infinitely variable speed transmission means interposed between said electric motor and said motion picture camera.

10. In an arrangement as set forth in claim 1, said light deflecting means being a mirror.

References Cited in the file of this patent

UNITED STATES PATENTS

| | | |
|---|---|---|
| 1,199,980 | Gilbreth | Oct. 3, 1916 |
| 1,816,290 | Klimis | July 28, 1931 |
| 2,229,721 | Brandt | Jan. 28, 1941 |
| 3,011,416 | Hammer | Dec. 5, 1961 |